Nov. 29, 1932.  G. WALTER  1,889,428
MOLD FOR MANUFACTURING HOLLOW BODIES OF CEMENT BY THE CENTRIFUGAL METHOD
Filed April 28, 1931
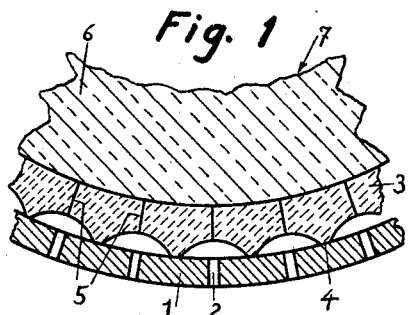
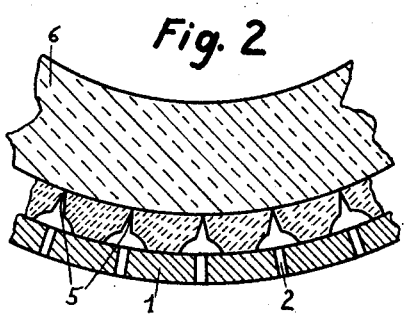
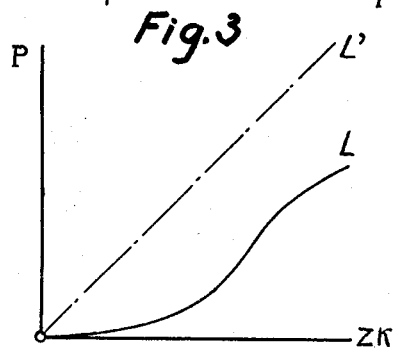
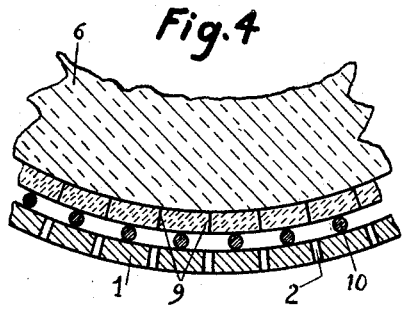
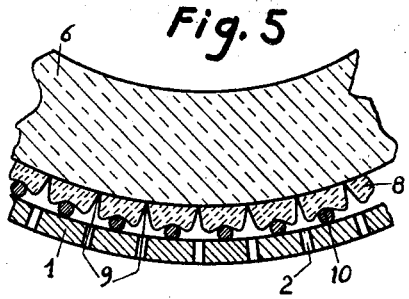
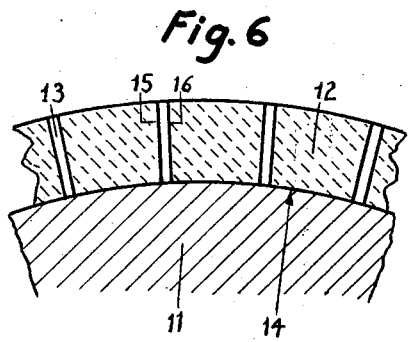
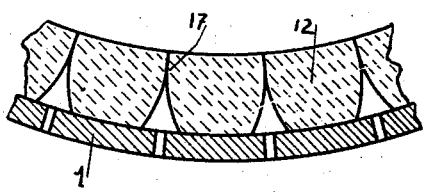
INVENTOR:
GEORGES WALTER.
BY: Ruege & Boyer
ATTORNEYS.

Patented Nov. 29, 1932

1,889,428

UNITED STATES PATENT OFFICE

GEORGES WALTER, OF PERROY, SWITZERLAND

MOLD FOR MANUFACTURING HOLLOW BODIES OF CEMENT BY THE CENTRIFUGAL METHOD

Application filed April 28, 1931, Serial No. 533,414, and in Germany May 8, 1930.

The subject-matter of the present invention relates to improvements in molds for making hollow bodies by the centrifugal method and consists essentially of a lining which, in contradistinction to those hitherto employed, is extraordinarily durable, remains unchanged in use and automatically regulates the discharge of water in such a manner that, at the beginning of the manufacturing operation and with a moderate centrifugal force, very little or no water passes through, while, towards the end of the manufacturing operation, the water is discharged in sufficient quantity.

For manufacturing hollow bodies by the centrifugal method, it was proposed at the beginning of this century to use felt, linen and other permeable linings in perforated centrifugal molds. Such linings have, however, the disadvantage of rapidly changing when in use and have to be frequently replaced. They also allow too much water to pass out at the beginning of the manufacturing process, this having a detrimental effect upon the quality of the product. If, on the other hand, the lining chosen were so dense that the loss of water at the beginning is too small to be harmful, its density would have to be such that, in the further course of the manufacturing process it would be impossible for sufficient water to pass through and consequently the product would not be capable of being immediately removed.

Consequently, such linings are not usable in practice except with the employment of preliminary special modern methods of compressing the building material. For this reason, about fifteen years later there were proposed linings which are absolutely impervious—e. g., loam layers, paraffin, rubber etc. It is true that these have the advantage of preventing the cement from adhering to the mold, but they have the substantial disadvantage that the finished hollow bodies cannot be immediately removed but must remain in the molds until they are sufficiently hard. This ordinarily takes 12 to 48 hours. The large number of molds that have to be employed represent so much dead capital and enormously increase the cost of manufacture.

The object of the present invention is the solution of the problem of entirely preventing, notwithstanding the increasing centrifugal force, the possibility of an escape of fine solid constituents, by so automatically regulating the discharge of water, that, at the beginning of the manufacturing process, very little or no water escapes, while towards the end of the manufacturing process, the water is discharged in abundant quantity.

According to the present invention, the filtering lining is formed with slits or other apertures, dividing the lining into a plurality of sections, the adjacent edges of which touch each other in the normal working position, the organization being such that the permeability of the lining, which, at the beginning, is nearly zero, continually increases up to a maximum value with the increase of the centrifugal force.

Three examples of a device according to the invention are shown in the accompanying drawings, in which Fig. 1 is a fragmentary section of a mold provided with a lining embodying the present invention, the parts being shown in the initial condition;

Fig. 2 is a similar view showing the parts in the final condition;

Fig. 3 is a diagram illustrating the operation of the mold;

Fig. 4 is a view similar to Fig. 1, but showing a modified form of lining;

Fig. 5 is a view of the mold and lining shown in Fig. 4, the parts being shown in the final condition;

Fig. 6 is a fragmentary sectional view illustrating a method of preparing a further modified form of lining; and Fig. 7 illustrates the lining shown in Fig. 6 in its initial condition in the mold.

In Fig. 1, 1 is the mold, which is formed with apertures 2 and is provided with a lining 3 made of rubber for example. This lining is provided with axially arranged longitudinal ribs 4 between which slits 5 are arranged, each individual slit extending in the axial direction only over a certain relatively short length.

The conglomerate located at 6 is, in the initial condition, centrifuged only to a small extent, so that its inner surface is not yet smoothed out as indicated at 7.

If now the centrifugal force attains its maximum value, the lining becomes distorted so that its cross-section takes the shape represented in Fig. 2. The conglomerate 6 has pressed the lining 3 against the mold 1, so that the outer periphery of this lining has lengthened itself and the slits 5 have been driven apart in such a manner that their inner surfaces are in contact with each other only for a fraction of the depth of the slits. It is true that in this way the parts of the inner surfaces of the lining sections which are still in contact are pressed towards each other more powerfully than in the initial condition, so that the permeability of the lining has increased to a smaller extent in comparison with the increasing centrifugal force; the net result, however, is that, on account of the considerably increased centrifugal force, the discharge of water is then considerably greater than at the beginning.

This is shown by the diagram of Fig. 3, in which the abscissæ indicate the centrifugal force ZK and the ordinates indicate the permeability P. If the permeability were to increase proportionally to the centrifugal force, a curve L' would be obtained. This, however, is not the case, and the example described gives a curve approximately such as L, from which it can be seen that the initially slowly increasing permeability increases more rapidly when the centrifugal force attains a certain value and then approaches a maximum value which cannot be exceeded.

Obviously, the ribs 4 could be replaced by suitable unevennesses of any kind or, in accordance with the following example, there could be employed a fabric which may or may not be connected with the lining, or which is integral with the mold and which could be replaced by suitable unevennesses of any kind on the mold.

In Fig. 4, 1 is again the mold which is formed with apertures 2 and is provided with the lining 8. The latter is likewise slit at 9.

Between the mold 1 and the lining 8 is placed a fabric 10 which, as desired, may be made of metal or of any substance which is preferably harder than the lining.

The alteration of the cross-section of the lining, when the centrifugal force has attained its maximum value, takes place as indicated in Fig. 5, from which it may be seen that the permeability of the lining follows approximately the same law as the permeability of the lining 3 of Fig. 2.

Fig. 6 illustrates a method of preparing a lining according to a third example, in the case of which the unprepared lining 12 laid upon a cylinder 11 is formed with narrow apertures 13. If now the lining prepared in this way is placed in the mold 1 (Fig. 7) in such a manner that the surface of the lining, that was in contact with the surface 14 of the cylinder, bears against the inner wall of the mold, the opposite surfaces 15 and 16 of the apertures are pressed toward each other, at least partially, as indicated at 17. It has been found in this case that it is advantageous to have the diameter of the cylinder 11 larger than the internal diameter of the mold. The mode of operation of this lining corresponds to that of the first two examples.

Obviously, instead of rubber, any desired suitable material may be chosen.

The unevennesses of the lining could be made by reinforcing it or by inserting any desired fabric therein.

The unevennesses of the mold could be made by applying a foreign body thereto as well as by working them in a smooth mold.

Further, readily compressible bodies formed with holes may be inserted between the slit lining and the mold.

Finally, the apertures of the permeable mold can be kept apart from each other, and even, if required, arranged up to the ends, in accordance with the shape of the unevennesses of the mold or of the lining.

By the term "hollow bodies" is meant hollow bodies such as are made of cement or other powdery binding agent that is mixed with water.

What I claim and desire to secure by Letters Patent of the United States of America is:

1. In a rotary mold for manufacturing hollow bodies by centrifugal action, a flexible lining having slits dividing its wall into a plurality of sections, the opposing edges of adjacent sections being normally in contact with each other, and means between said lining and the mold and effective to cause progressive separation of said edges as the speed of rotation of the mold increases.

2. In a rotary mold for manufacturing hollow bodies by centrifugal action, a flexible lining having slits dividing its wall into a plurality of sections, the opposing edges of adjacent sections being normally in contact with each other, said lining having on its outer periphery a plurality of ribs in engagement with the wall of the mold and effective under centrifugal force to distort said sections thereby to cause progressive separation of the edges thereof.

3. In a rotary mold for manufacturing hollow bodies by centrifugal action, a flexible lining having slits dividing its wall into a plurality of sections, the opposing edges of adjacent sections being normally in contact with each other, and a spacing member disposed between each section and the wall of the mold, said spacing members being effective to distort the respective sections under centrifugal force thereby to cause progressive separation of the edges thereof as the speed of rotation of the mold increases.

In testimony whereof I have signed my name to this specification.

GEORGES WALTER.